United States Patent
Frimat et al.

(10) Patent No.: US 12,285,733 B2
(45) Date of Patent: Apr. 29, 2025

(54) CROSS-CORRUGATED PACKING MADE FROM METAL FOAM

(71) Applicant: L'Air Liquide, Societe Anonyme l'Etude et l'Exploitation des Procedes Georges Claude, Paris (FR)

(72) Inventors: David Frimat, Les Loges en Josas (FR); Daniel Gary, Les Loges en Josas (FR); Clement Lix, Paris (FR); Frederic Rouseau, Les Loges en Josas (FR); Bernard Saulnier, Les Loges en Josas (FR); Mikael Wattiau, Les Loges en Josas (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 652 days.

(21) Appl. No.: 17/603,567

(22) PCT Filed: Apr. 16, 2020

(86) PCT No.: PCT/EP2020/060646
§ 371 (c)(1),
(2) Date: Oct. 13, 2021

(87) PCT Pub. No.: WO2020/212460
PCT Pub. Date: Oct. 22, 2020

(65) Prior Publication Data
US 2022/0219134 A1    Jul. 14, 2022

(30) Foreign Application Priority Data
Apr. 16, 2019   (FR) .................................. FR 1904018

(51) Int. Cl.
*B01J 19/32*   (2006.01)
*F25J 3/04*    (2006.01)

(52) U.S. Cl.
CPC ........... *B01J 19/32* (2013.01); *F25J 3/04636* (2013.01); *B01J 2219/3221* (2013.01);
(Continued)

(58) Field of Classification Search
CPC ................ B01J 19/32; B01J 2219/3221; B01J 2219/3222; B01J 2219/32237;
(Continued)

(56) References Cited

U.S. PATENT DOCUMENTS 5,267,444 A   12/1993   Lehman et al.
9,375,655 B2   6/2016   Billingham et al.
(Continued)

FOREIGN PATENT DOCUMENTS

CN   101 555 138   10/2009
CN   105 771 873    7/2016
(Continued)

OTHER PUBLICATIONS

English Abstract of WO 2012/102876 A1 (Year: 2012).*
(Continued)

*Primary Examiner* — Charles S Bushey
(74) *Attorney, Agent, or Firm* — Justin K. Murray

(57) ABSTRACT

Disclosed is a packing made up of a stack of plates, having been shaped to form corrugations in the plate and assembled to form a cross-corrugated packing block for a mass and/or heat transfer application, wherein the material of the packing plates is an open-pore metal foam, and in that the specific surface area of the packing is greater than 500 m2/m3 and in that the thickness (e) of the plate is less than 2 mm before the shaping operation.

10 Claims, 2 Drawing Sheets

(52) U.S. Cl.
CPC ............... *B01J 2219/3222* (2013.01); *B01J 2219/32237* (2013.01); *B01J 2219/32262* (2013.01); *B01J 2219/32408* (2013.01); *F25J 2200/08* (2013.01); *F25J 2200/90* (2013.01)

(58) Field of Classification Search
CPC .... B01J 2219/32262; B01J 2219/32408; F25J 3/04636; F25J 2200/08; F25J 2200/90
See application file for complete search history.

(56) References Cited

U.S. PATENT DOCUMENTS

| | | | |
|---|---|---|---|
| 2015/0136582 A1 | 5/2015 | Takeyama et al. | |
| 2016/0263548 A1* | 9/2016 | Billingham | B01J 19/32 |
| 2017/0021324 A1* | 1/2017 | Blanchet | B01J 15/005 |
| 2019/0046949 A1 | 2/2019 | Hirschberg | |
| 2019/0151820 A1 | 5/2019 | Gocke et al. | |

FOREIGN PATENT DOCUMENTS

| | | |
|---|---|---|
| EP | 3 263 211 | 1/2018 |
| FR | 2 675 568 | 10/1992 |
| FR | 2 990 631 | 11/2013 |
| WO | WO 01/94006 | 12/2001 |
| WO | WO 2012/102876 A1 * | 8/2012 |
| WO | WO 2013/001275 A2 * | 1/2013 |

OTHER PUBLICATIONS

English Abstract of WO 2013/001275 A2 (Year: 2013).*
International Search Report and Written Report for PCT/EP2020/060646, mailed Aug. 5, 2020.
French Search Report and Written Report for FR 1 904 018, mailed Sep. 26, 2019.
H. Li, et al., "A Novel Potential Application of SiC Ceramic Foam Material to Distillation: Structured Corrugation Foam Packing," Chemical Engineering Transactions, vol. 69, (2018), 6 pgs.
H. Li, et al., "Liquid flow behavior study in SiC foam corrugated sheet using a novel ultraviolet fluorescence technique coupled with CFD simulation," Chemical Engineering Science 123, (2015), pp. 341-349.
X. Li, et al., "Multiscale Simulation and Experimental Study of Novel SiC structured Packings," Ind. Eng. Chem., Res. 51, (2012), pp. 915-924.

* cited by examiner

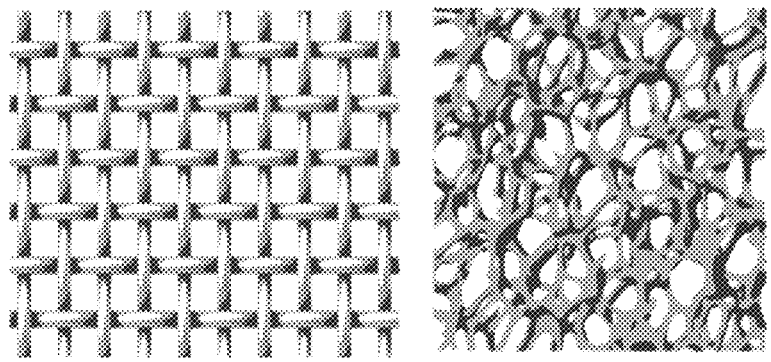
FIG. 3A
(Prior Art)
FIG. 3B
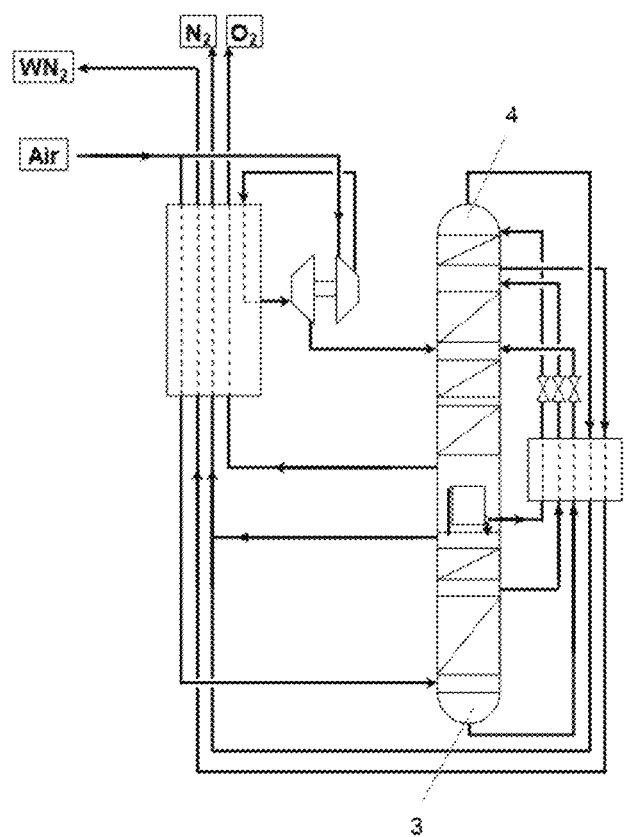
FIG. 4

CROSS-CORRUGATED PACKING MADE FROM METAL FOAM

CROSS REFERENCE TO RELATED APPLICATIONS

This application is a § 371 of International PCT Application PCT/FR2020/060646, filed Apr. 16, 2020, which claims the benefit of FR1904018, filed Apr. 16, 2019, both of which are herein incorporated by reference in their entireties.

FIELD OF THE INVENTION

The present invention relates to a cross-corrugated packing made of metal foam, particularly suited to the field of fluid-contacting equipment. This involves in particular the field of plates of structured packing fitted to material and heat exchange columns. This invention applies most especially to the columns intended for counterflow gas-liquid transfers, which include stripping, absorption and distillation columns.

BACKGROUND OF THE INVENTION

Structured packings made of cross-corrugated sheets in most instances constitute the most effective technical solution for gas-liquid mass transfer operations. In comparison with the other families of contactors, which include random packings and distillation plates, they lead to lower pressure drops for the same separation, while at the same time having a high capacity and high efficiency. Their low pressure drops lead to an energy saving and therefore to a reduction in the operating cost. The gas capacity and the efficiency are reflected in the compactness of the equipment both in terms of cross section and in terms of height. Reducing the dimensions of the column corresponds to a reduction in the initial outlay.

These relative savings that can be attributed to the structured packings are particularly significant in the case of processes involving small amounts of liquid reflux. This is notably the case with atmospheric pressure distillation columns and more especially so with columns operating under vacuum.

In order to derive the greatest benefit from the effectiveness of cross-corrugated packings, attempts may be made to increase the specific surface area of the packings, notably by reducing the height of the corrugations. This then yields a greater developed surface area for a given volume, allowing a greater exchange and therefore a reduced section height.

Packings in which the specific surface area exceeds 400 $m^2/m^3$ are sometimes referred to as high-density packings.

The structured packings with the greatest density can reach as much as 2100 $m^2/m^3$ in a laboratory setting. However, there are very few examples exceeding 1000 $m^2/m^3$ in industry.

The specific surface area $a_p$ can be calculated using the following formula:

$$a_p = \frac{4\,s}{b\,h}(1-\tau)$$

where $a_p$ is in $m^2/m^3$, s is the developed length of the side of a corrugation, b is the length of the base of a corrugation (the pitch of the corrugation), h is the height, and $\tau$ is the level of perforation of the corrugation. The lengths s, b and h are depicted in FIG. 2.

Cross-corrugated packings are highly sensitive to the phenomena of drying-out, and are especially so if the film of liquid is a thin film. The drying-out of the packing reduces the effective area for gas-liquid contact and therefore reduces the effectiveness of the packing. In the case of low liquid flow rates and high specific surface areas, a very small amount of liquid has to be distributed over a large area of packing. In such cases, this distribution is relatively difficult to achieve.

For drying-out reasons, most suppliers do not offer solid-sheet packings upward of 500 or 700 $m^2/m^3$. The solution generally adopted consists in the use of sheets made of woven material or gauze. A carefully dimensioned woven metal allows better spreading of the liquid by capillary action over and through the packing sheet.

However, such materials are very expensive and more complex to form with a traditional press.

The use of sheets made from foam enables wetting qualities superior to those of woven materials (H. Li et al./Chemical Engineering Transactions VOL 69 (2018), H. Li et al./Chemical Engineering Science 123 (2015) 341-349) to be obtained for a lower cost. This explains why structured packings made of SiC ceramic foam obtain better efficiencies for light liquid loads (X. Li et al./Ind. Eng. Chem. Res. 51 (2012), 915-924). CN101555138A proposes a method of manufacture for corrugated sheets made of SiC (silicon carbide) ceramic foam.

However, ceramic foams cannot be formed in the same way as metal structured packing sheets.

They are cast directly in their final shape. They are fragile and expensive. In addition, the recommended pore size is too high to benefit from capillary effects.

U.S. Pat. No. 9,375,655 proposes the application of foam-type material for cross-corrugated packings for air distillation in a range extending from 100 $m^2/m^3$ to 500 $m^2/m^3$ with a complex sizing criterion to limit the velocity of the gas so that a sufficient fraction of the gas is able to pass through the pores of the foam.

CN105771873 describes a packing formed from a stack of corrugated sheets made of nickel foam.

FR2675568 describes a packing made of perforated metal strips of the cross-corrugated type.

US2019/046949 describes a packing made of metal foam which is not a cross-corrugated packing.

US2015/136582 describes a cross-corrugated packing made of a metal frit.

WO01/94006 discloses a packing based on sintered metal fibers.

EP3263211 and FR2990631 disclose metal foams but make no reference to cross-corrugated packings.

SUMMARY OF THE INVENTION

It is an object of certain embodiments of the invention to increase the specific surface area between the gas and the liquid while allowing a significant fraction of the gas to enter the three-dimensional structure of the foam. It assumes that the entire surface of the foam is wetted, particularly the fraction of the foam through which the gas passes.

Experience demonstrates that this last condition is particularly difficult to satisfy. The improvement hoped for by increasing the surface area for exchange between the gas and the liquid in the internal structure of the foam is therefore placed in jeopardy. The invention focuses on, although is not limited to, SiC foam.

The limits on the manufacture of SiC foam and the sizing criterion lead to a foam that is relatively thick, having a thickness of between 0.4 and 10 mm, and to a gas velocity that is relatively low, given the macroscopic-scale specific surface area of the packing. This excludes the field of very-high-density packings.

It is an object of certain embodiments of the present invention to significantly reduce the height of the high-density structured-packing sections of gas-liquid exchange columns for a given gas flow rate and exchange performance.

Certain embodiments of the invention are more particularly concerned with fluids that have a surface tension of less than 25 mN/m, or even less than 15 mN/m.

According to one subject-matter of the invention, there is provided a packing made from a stack of leaves having been shaped to form corrugations in the leaf and assembled to form a pack of packing for a mass and/or heat transfer application, the material of the packing leaves being a metal foam, characterized in that the leaves are assembled to form a cross-corrugated pack of packing, the material of the packing leaves is an open-pore metal foam, in that the specific surface area of the packing is greater than 500 $m^2/m^3$, and in that the thickness (e) of the leaf is less than 2 mm before the shaping operation.

According to other optional features:
the specific surface area of the packing is greater than 700 $m^2/m^3$.
the thickness of the leaf before it enters the press is less than 0.6 mm before the bending operation.
the metal foam material consists predominantly of nickel.
the metal foam material consists predominantly of copper.
the metal foam material consists of an alloy of FeCrAl type.
the metal foam material consists of an alloy of NiCrFeAl type.
the metal foam material has a pore density of between 10 and 130 ppi (pores per inch), preferably between 30 and 80 ppi.

According to another subject-matter of the invention, there is provided a process for separating the air gases by cryogenic distillation in an air separation unit comprising a first column operating at a first pressure thermally connected to a second column operating at a second pressure lower than the first pressure and possibly a third column connected to the second column by a pipe conveying argon-enriched gas, the second column and/or the third column containing a packing body made up of a stack of cross-corrugated leaves for performing the mass and heat transfer, the leaves being shaped in order to corrugate them, the body being situated between two adjacent openings in the column that allow a fluid to be admitted or withdrawn, the specific surface area of the packing being greater than 500 $m^2/m^3$, the thickness of the leaf being less than 2 mm before the shaping operation, and the material of the packing sheets is an open-pore metal foam, wherein a flow of air that is to be separated is sent to the first column, oxygen-enriched and nitrogen-enriched fluids are sent from the first column to the second column, at least one nitrogen-enriched fluid is withdrawn from the second column, at least one oxygen-enriched fluid is withdrawn from the second column, where applicable, an argon-enriched fluid is sent from the second column to the third column, the length travelled by a liquid produced by air separation progressing by capillary action through the foam during the residence time for which the liquid resides in the packing body being greater than ten times the pitch of the corrugation of the leaf.

As a preference, the length travelled by a liquid produced by air separation progressing by capillary action through the foam during the residence time for which the liquid resides in the packing body is greater than fifteen times, or even twenty times, the pitch of the corrugation of the leaf.

As a preference, the metal foam packing is used in a gas-liquid material exchange column section, where the liquid reflux is less than 20 $m^3/h/m^2$, preferably less than 10 $m^3/h/m^2$.

To this end, one subject-matter of the present invention is a packing made of cross-corrugated sheets for a mass and/or heat transfer application, characterized in that:
the material of the packing sheets is an open-pore metal foam,
the specific surface area of the packing is greater than 500 $m^2/m^3$, preferably greater than 700 $m^2/m^3$,
the thickness of the sheet is less than 2 mm, preferably less than 0.6 mm before it enters the press.

Such a material used in high-density packings is able to encourage the liquid to spread over the sheets thanks to the capillary effects caused by the porosity. The attraction of the liquid into the material enables the drying-out phenomena to be reduced, thus increasing the effective surface area for contact between the phases and leading to a better efficiency of the high-density packings subjected to low levels of liquid reflux.

The higher the specific surface area of the packing, the more significant the material effects will be. It is therefore particularly recommended for very high densities, notably densities in excess of 700 $m^2/m^3$.

The resulting thickness on leaving the press, after the corrugated ripples have been shaped, is less than the initial thickness. It is typically less than 0.5 mm. The thickness of the sheet before shaping in the press is less than 2 mm, preferably less than 0.6 mm.

This small thickness makes it possible to benefit from the capillary spreading effect of the porous surface without having a negative impact on the level of voids corresponding to the passage for the gas. Specifically, a large thickness of porous material, once it becomes saturated with liquid, represents a dead volume as far as gas-liquid exchange is concerned.

In addition, the diffusion of material within the liquid is maximized if the liquid environment is a porous environment. This penalizes the transfer of material within the liquid, thereby contributing to reducing the efficiency of the packing.

Tests have demonstrated that metal foams that have been carefully dimensioned and tailored to suit the characteristics of the fluid employed have a spreading effect superior to that of woven metal, this being for a lower cost and greater ease of bending in a press. The foam may be an alloy of iron, of copper, of aluminum or of nickel. This broad range of materials provides adaptability to suit compatibility with the products. For example, nickel and copper are preferred in the case of distillation where there is a high oxygen concentration.

With these dimensions and with low levels of liquid reflux, notably of below 20 $m^3/m^2/h$ or even below 10 $m^3/m^2/h$, the hydraulic conditions allow optimal use to be made of the characteristics of the foam in terms of wettability. The asperities caused by the complex shape of the foam increase the effective surface area for contact between phases.

Transfer is improved by optimal use of the large exchange surface area of the very-high-density packing. This advantage is lost for high liquid loads where the liquid floods these asperities and where the drying-out phenomenon is very low even for a smooth sheet. The benefit of this invention is at its maximum for low liquid flow rates, high specific surface areas and wetting fluids.

Calculating a Nusselt thickness δ for the film of liquid on the packing makes it possible to obtain an effective velocity of the liquid under gravity flow:

$$\delta = \left( \frac{3\,\mu_L\,u_{Ls}}{\rho_L\,g\,a_p\,\sin\alpha_L} \right)^{1/3}$$

$$u_{Le} = \frac{u_{Ls}}{\varepsilon\,a_p\,\delta\,\sin\alpha_L}$$

The residence time for which the liquid is in residence in the module can then be estimated:

$$t_{res\,L} = h_{pack}/u_{Le}$$

The smaller the pores, the greater the capillary force, but upward of a certain pore density, viscous friction dictates the optimum speed of spread. The pore density of metal foams is generally comprised between 10 and 130 ppi (pores per inch, this being the international unit used in the art). The length travelled by capillary action over a given time can be estimated using the following formula:

$$l_{cap} = \sqrt{\frac{\sigma_L\,r_{pore}\,t_{res\,L}}{\mu_L}}$$

This formula makes it possible to dimension the foam in such a way that the capillary spread is at a maximum given the properties of the fluid, of the foam and the geometry of the packing. The saving in volume becomes appreciable when the value of $l_{cap}$ is greater than 10 times the corrugation pitch b. Under such conditions, the packing described by the present invention allows a considerable reduction in the volume of a column section for a given capacity and a given purity.

These performance aspects are even superior to those of woven metal packings, thanks to the three-dimensional structure of the foam, and for a reduced cost.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

FIG. 3 depicts the material structure of a woven metal and of a metal foam.

FIG. 4 depicts the invention described below through an example of use in a process for separating air gases using distillation. This is depicted using a simplified diagram in FIG. 4.

DETAILED DESCRIPTION OF THE INVENTION

Figure 1:
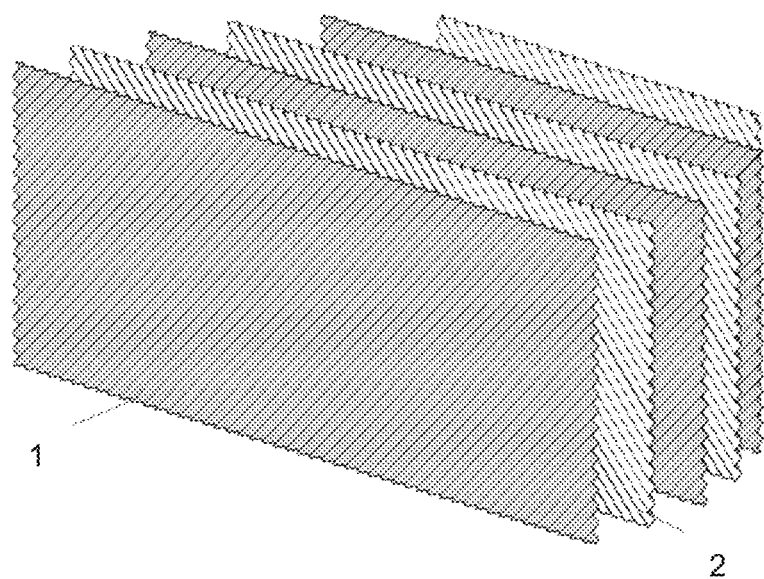
FIG. 1 schematically indicates the typical geometry of cross-corrugated packings.
Figure 2:
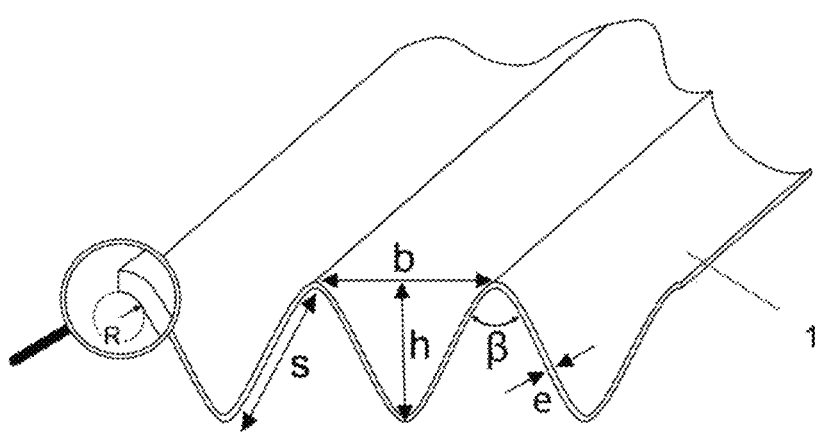
FIG. 2 indicates the various geometric parameters of a corrugation of a cross-corrugated packing.

FIG. 1 illustrates part of a packing module made up of a stack of corrugated leaves 1, 2 oriented in such a way that the corrugations are crossed from one leaf to the next. Each leaf is identical and the stack is constructed by turning round one leaf in two. The corrugations illustrated in FIG. 2 have a pitch b, a height h, a thickness e, a corrugation-side developed length s and a bend angle β between two sides of a corrugation.

According to the prior art, the leaves are made of perforated aluminum or of gauze (FIG. 3A). According to the present invention, the leaves are made of metal foam (FIG. 3B) with open pores. The specific surface area is greater than 500 m²/m³, preferably greater than 700 m²/m³.

The thickness e of the leaf before entering the press is less than 2 mm, preferably less than 0.6 mm before entering the press to form the bent leaf.

The metal foam material may consist predominantly of nickel or predominantly of copper.

The metal foam material may consist of an alloy of FeCrAl type or of an alloy of NiCrFeAl type.

The metal foam material has a pore density of between 10 and 130 ppi, preferably between 30 and 80 ppi.

One industrial application of this packing is the separation of air gases using cryogenic distillation. The process is indicated schematically in FIG. 4. A flow of air enters the main exchanger at a pressure close to 6 bar. It has been purified beforehand to remove the water and carbon dioxide that it contained in the atmosphere.

It is cooled by flowing in the counter-flow direction with respect to the products leaving the cryogenic distillation stage. A more or less complex system of compressors and turbines provides top-up cooling. This compensates for the loss of frigories caused by the temperature offset at the cold end of the exchanger, the inputs of heat and the possible production of liquid. The latter is not indicated in the diagram.

The cooled air at its dew point then enters a medium-pressure first distillation column 3 where rectification takes place producing, at the top of the column, a medium-pressure flow of gaseous nitrogen. At the bottom, an oxygen-enriched liquid is extracted to be distilled in a second column 4 at a low pressure, which is to say a pressure close to atmospheric pressure.

In this stripping second column 4, the liquid is further enriched with oxygen to achieve a commercial purity in the bottom. From this second column 4 there may be extracted a flow of a mixture of oxygen and of argon which is then distilled in two or three successive columns in order to obtain argon with a commercial purity. These columns are not indicated in the diagram.

In order to obtain a reflux of liquid in the medium-pressure column 3, the nitrogen is condensed in a heat exchanger. Similarly, in order to obtain an upflow of gas in the low-pressure column 4, the oxygen is vaporized, likewise in a heat exchanger. In practice, it is the one same heat exchanger which on one side condenses the liquid nitrogen and on the other vaporizes the liquid oxygen. It is in order for this to be thermodynamically possible that the first column 3 is at a medium pressure where the nitrogen liquefaction temperature is slightly above the boiling point of oxygen at atmospheric pressure.

In order to increase the nitrogen extraction rate, a reflux of liquid nitrogen from the top of the medium-pressure column 3 is sometimes added to the low-pressure column 4 in order to produce a little more nitrogen at the top. One or two liquid reflux connections are also generally added at an intermediate height in order to optimize the profiles of the flow rates in the columns and increase the overall efficiency of the process.

The hydraulic conditions of the low-pressure column 4 entail relatively low liquid reflux values, typically of below 25 m³/h/m² at the bottom and up to less than 10 m³/h/m² at the top. The packings used are relatively dense, having a specific surface area that may exceed 500 m²/m³.

Under such conditions and without major modification to the packing production system, it is possible to replace material that generally takes the form of perforated aluminum sheets with corrugated leaves made of metal foam. At the bottom of the low-pressure column 4, the value obtained for the length $l_{cap}$ travelled, by a liquid, by capillary action is 135 mm, namely 15 times the value of the pitch b of the corrugation. Experimental testing has demonstrated that, for no change in processing capacity, the reduction in height of the packed sections, namely the height of a leaf 1, 2, may exceed 15%.

The argon columns also have low liquid reflux, of the order of 15 m³/h/m², and in general, very dense packings, notably of a specific surface area in excess of 700 m²/m³. In the same way as for the low-pressure column, it is possible to use a packing made of metal foam. The value obtained for $l_{cap}$ is 126 mm, namely 20 times the value at the base b of the corrugation. With these high densities, the height reduction may exceed 25% without impairing the processing capacity.

The volume savings expected through use of the present invention are even greater when the packing has a greater density. The spreading effect promoted by the metal foam is all the more significant when the surface area to be irrigated is great.

Liquid oxygen has a surface tension of less than 13.2 mN/m, liquid argon less than 12.6 mN/m and liquid nitrogen than 8.9 mN/m at atmospheric pressure. The tension decreases with pressure: at 5 bar, the surface tension values for the same liquids are 8.7, 8.1 and 5.3 mN/m.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

TABLE 1

| Key | | |
|---|---|---|
| Symbol | Unit | Description |
| $a_p$ | m²/m³ | Specific surface area |
| b | m | Pitch, base of a corrugation |
| e | m | Sheet thickness |
| g | m/s² | Acceleration due to gravity |
| h | m | Corrugation height |
| $h_{pack}$ | m | Height of a pack of packing |
| $l_{cap}$ | m | Length travelled by capillary action |
| $r_{pore}$ | m | Mean pore radius |
| s | m | Corrugation-side developed length |
| $t_{resL}$ | s | Liquid residence time |
| $U_{Le}$ | m/s | Effective liquid velocity |
| $U_{Ls}$ | m/s or m³/h/m² | Surface liquid velocity |
| $\alpha_L$ | ° | Angle of greatest slope of packing wrt horizontal |
| β | ° | Corrugation bend angle |
| δ | m | Nusselt film thickness |
| ε | | Level of voids in packing |
| $\mu_L$ | Pa · s | Liquid viscosity |
| $\rho_L$ | kg/m³ | Specific mass (density) of liquid |
| $\sigma_L$ | N/m | Liquid surface tension |
| τ | | Level of perforation of the sheet |

The invention claimed is:

1. A process for separating air gases by cryogenic distillation in an air separation unit, wherein the air separation unit comprises a system of columns comprising a first column and a second column, the process comprising the steps of:
   operating the first column at a first pressure, wherein the first column is thermally connected to the second column that is operating at a second pressure lower than the first pressure,
   wherein at least one column within the system of columns operating at a pressure lower than the first pressure contains a packing;
   sending a flow of air that is to be separated to the first column;
   sending an oxygen-enriched fluid and a nitrogen-enriched fluid from the first column to the second column; and
   withdrawing a second nitrogen-enriched fluid from the second column;
   withdrawing a second oxygen-enriched fluid from the second column,
   wherein the packing is made from a stack of leaves having been shaped to form corrugations in the leaf and assembled to form a packing body for a mass and/or heat transfer application, the material of the packing leaves being a metal foam, the material of the packing leaves is an open-pore metal foam, in that the specific surface area of the packing is greater than 500 m²/m³, and in that the thickness of the leaf is less than 2 mm before the shaping operation
   wherein a length travelled by a liquid produced by air separation progressing by capillary action through the metal foam during a residence time for which the liquid resides in the packing body being greater than ten times a pitch (b) of the corrugation of the leaf.

2. The process as claimed in claim 1, wherein the system of columns further comprises a third column connected to the second column by a pipe conveying argon-enriched gas, wherein the third column has an operating pressure lower than the first pressure, wherein the process further comprises the step of sending an argon-enriched fluid from the second column to the third column.

3. The process as claimed in claim 1, wherein the metal foam packing is used in a gas-liquid material exchange column section, where a liquid reflux is less than 20 m³/h/m².

4. The process as claimed in claim 1, wherein the metal foam packing is used in a gas-liquid material exchange column section, wherein a liquid reflux is less than 10 m³/h/m².

5. The process as claimed in claim 1, wherein the length travelled by the liquid produced by air separation progressing by capillary action through the metal foam during the residence time for which the liquid resides in the packing body is greater than 15 times the pitch (b) of the corrugation of the leaf.

6. The process as claimed in claim 1, wherein the length travelled by the liquid produced by air separation progressing by capillary action through the metal foam during the residence time for which the liquid resides in the packing body is greater than 20 times the pitch (b) of the corrugation of the leaf.

7. The process as claimed in claim 1, wherein the specific surface area of the packing is greater than 700 m²/m³.

8. The process as claimed in claim 1, wherein the thickness of the leaf before it enters the press is less than 0.6 mm before the bending operation.

9. The process as claimed in claim 1, wherein that the metal foam material consists predominantly of nickel or copper.

10. The process as claimed in claim 1, wherein the length travelled by the liquid is calculated by the following formula:

$$l_{cap} = \sqrt{\frac{\sigma_L r_{pore} t_{resL}}{\mu_L}}$$

wherein $\sigma_L$ is a surface tension of the liquid, $r_{pore}$ is a mean pore radius, $t_{resL}$ is the residence time of the liquid, and $\mu_L$ is viscosity of the liquid.

* * * * *